United States Patent [19]

Alpert et al.

[11] Patent Number: 4,870,292

[45] Date of Patent: Sep. 26, 1989

[54] FIBRE OPTIC SENSOR FOR LIQUID LEVEL AND OTHER PARAMETERS

[75] Inventors: Martin D. Alpert, Dartmouth; James W. Snow, Bedford, both of Canada

[73] Assignee: Focal Marine Limited, Bedford, Canada

[21] Appl. No.: 168,481

[22] Filed: Mar. 15, 1988

[51] Int. Cl.⁴ ............................................. G01N 15/06
[52] U.S. Cl. .................................... 250/577; 250/227; 73/293
[58] Field of Search .................. 250/227, 577; 73/293; 340/619

[56] References Cited

U.S. PATENT DOCUMENTS

| | | | |
|---|---|---|---|
| 3,995,168 | 11/1976 | Neuscheler et al. | 250/577 |
| 4,119,860 | 10/1978 | Gooley | 250/577 |
| 4,246,489 | 1/1981 | Yoshida | 250/227 |
| 4,354,180 | 10/1982 | Harding | . |
| 4,440,022 | 4/1984 | Masom | 250/577 |
| 4,727,247 | 2/1988 | Johnston | 250/577 |
| 4,788,444 | 11/1988 | Williams | 250/577 |

FOREIGN PATENT DOCUMENTS

| | | |
|---|---|---|
| 913927 | 11/1972 | Canada . |
| 1087269 | 10/1980 | Canada . |
| 1102151 | 6/1981 | Canada . |
| 1115084 | 12/1981 | Canada . |
| 1154117 | 9/1983 | Canada . |
| 1190762 | 7/1985 | Canada . |

OTHER PUBLICATIONS

"Innovations", Oct., 1987, vol. 2, No. 1, pp. 6-7.
Belkerdid et al.; "Fiber Optic Fluid Level Sensor", SPIE vol. 566, Fiber Optic and Laser Sensors III. (1985), pp. 153-158.
K. Spenner et al.; "Experimental Investigations on Fiber Optic Liquid Level Sensors and Refractometers"; pp. 96-99.

Primary Examiner—Edward P. Westin
Assistant Examiner—Khaled Shami
Attorney, Agent, or Firm—Jones, Tullar & Cooper

[57] ABSTRACT

A fibre optic sensor, particularly for ascertaining fluid levels, utilizes at least two optical fibres having at least a portion thereof embedded in a transparent substrate material of similar refractive index. One of the fibres is coupled to a light source, the other to a light detector. The fibres are oriented in a plane relative to the interface between substrate and fluid so that light exiting the source fibre is coupled to the detector fibre when total internal reflection at the interface occurs in the presence of a first fluid. In the presence of a second fluid of higher refractive index than the first fluid there will be no coupling. Several different embodiments, to achieve discrete or continuous level sensing or the sensing of other parameters are disclosed.

12 Claims, 6 Drawing Sheets

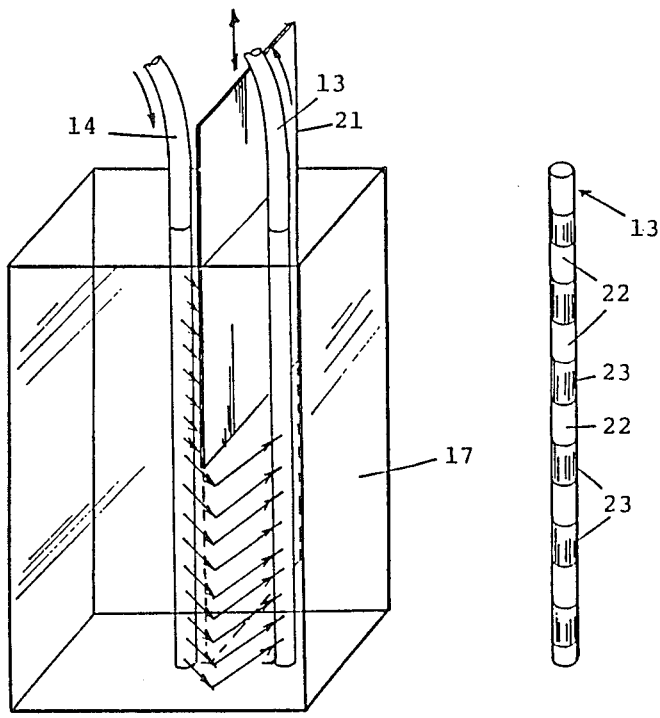
FIGURE 7
FIGURE 8
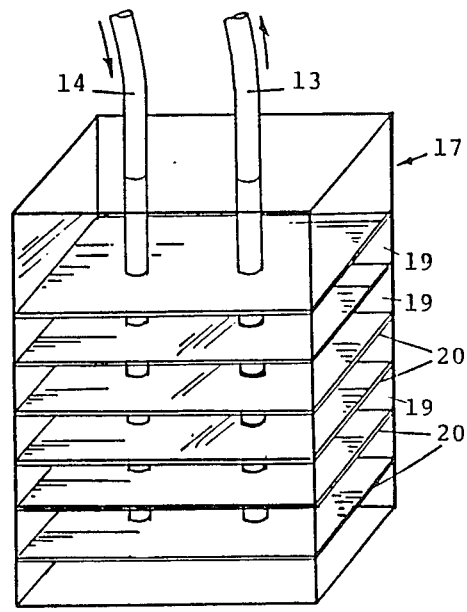
FIGURE 6

FIBRE OPTIC SENSOR FOR LIQUID LEVEL AND OTHER PARAMETERS

This invention relates to a method and apparatus for optically detecting a liquid level or other physical parameters.

BACKGROUND OF THE INVENTION

Conventionally, the level of a liquid in a vessel is detected using a float with a mechanical or magnetic coupling to an external gauge, an ultrasonic or optical transducer which measures time of flight to deduce the liquid level, or a parallel wire capacitance sensor which monitors the change in the dielectric constant between the wires associated with a change in liquid level.

The application of fibre optics to level sensing in liquids is well documented. The principal advantages of this type of level sensor are its passivity, i.e. no moving or mechanical parts, and its intrinsic dielectric properties which mean no spark hazard when used with combustible fluids and virtually zero susceptibility to electromagnetic interference. The more common implementations use small prisms mounted at the end of two optical fibres, a conically shaped optical fibre tip, or a U-shaped bent optical fibre [Canadian Patent No. 1102151](devices of these types are described for example in the article "Experimental Investigations on Fibre Optic Liquid Level Sensors and Refractometers" by K. Spenner et al - IEE OFS 221 pages 96-99). In all instances, the optical fibre probe or sensor is suspended or made to protrude into the vessel and the potentially fragile sensor is exposed to damage by floating debris, vibration, and dynamic effects during filling. The potential for damage is increased if routine maintenance of the sensor is required due to biological or chemical fouling of the optical surface.

The fibre optic sensors just described are exclusively for discrete level measurement, e.g. to sense whether the vessel is empty or full or at some intermediate point. A multiplicity of such point sensors generally represents an impractical configuration for a continuous liquid level measure. A continuous measure is desirable, however, for improved resolution in many applications. Consider the case of an aircraft fuel gauging system. The dielectric properties of the optical fibre sensor are desirable from the point of view of safety with respect to spark hazard and lightning strikes but high resolution and accuracy are also desirable so that excess fuel quantities would not have to be carried, thus reducing aircraft weight and consequently fuel consumption. Present day aircraft fuel level sensors are for the most part capacitance type sensors which lose accuracy when the fuel becomes laden with water and the dielectric constant is changed significantly.

Only one continuous fibre optic liquid level sensor has been found reported thus far ["Fibre Optic Fluid Level Sensor" by M. Belkerdid, N. Ghanderharioun, and B. Brennan in the Proceedings of SPIE Conference 566 Fibre Optic and Laser Sensors III (1985) pages 153-158]. Based on the bending or cladding loss principle, it consists of large loops of a single fibre, the loops being of ever increasing diameter, which are suspended in the liquid. Here again, the sensor packaging is not sufficiently robust for most applications.

SUMMARY OF THE INVENTION

We describe a simple configuration based on the total internal reflection principle used in the prism and cone type sensor, in which the optical fibres are embedded in an optically transparent substrate material that provides for protection of the sensor and also provides a surface which can be cleaned. This same packaging geometry can be applied both to discrete or point liquid level sensors and to a continuous or analog liquid level sensor.

It is well known that the relative refractivity and hence the critical angle of total reflection at an interface are dependent on the indices of refraction of the two media forming the interface. This is more often referred to as Snell's law, $n_1 \sin \theta_1 = n_2 \sin \theta_2$, which describes the relationship between the angles of incidence $\theta_1$ and refraction $\theta_2$ for a light ray propagating in a medium of refractive index $n_1$, incident on a medium of refractive index $n_2$. Using this equation it is evident that for $n_2 > n_1$ there is a limiting angle of incidence called the critical angle, given by the arcsine of the ratio of the refractive indices, beyond which total internal reflection occurs.

In this discussion, the terms liquid and air refer to any two fluids of sufficiently different refractive indices to be sensed by this refractometric technique. Hence air might equally well refer to the gaseous phase of the sensed liquid or to another liquid as in the case of oil and water. Similarly, the term optical fibre might equally well describe any elongated light conducting body or light guide capable of conveying light by multiple internal refractions.

Both the point and the continuous liquid level sensors described herein consist of two fibres, a source or transmit optical fibre having one end adapted to be optically connected to an external light source, and a detector or receive optical fibre having one end adapted to be optically connected to an external light detector. The source and detector optical fibres each have at least the other end thereof embedded in an optically clear substrate material or window that is in contact with the liquid to be sensed such that the light exiting the source fibre is incident on the substrate to liquid or air interface at an angle between the critical angle for the liquid and the critical angle for air. The substrate or window material has a refractive index equal or nearly equal to that of the core of the optical fibre so that the maximum refractive index mismatch will occur at the interface to the liquid. The detector fibre is mounted at an identical angle with respect to a normal to the interface so as to receive any light from the source which is internally reflected from the interface. Hence a received light signal will only occur at the external light detector when a portion of the sensor is exposed to air. A mechanism can be easily included to provide for detection of any failure in the sensor's optical path from and including the light source to the detector.

BRIEF DESCRIPTION OF THE DRAWINGS

This invention will be described in more detail hereinafter in connection with the accompanying drawings in which:

FIGS. 6, 7 and 8 show additional embodiments of the present invention.

DESCRIPTION OF THE PREFERRED EMBODIMENT

Figure 1:
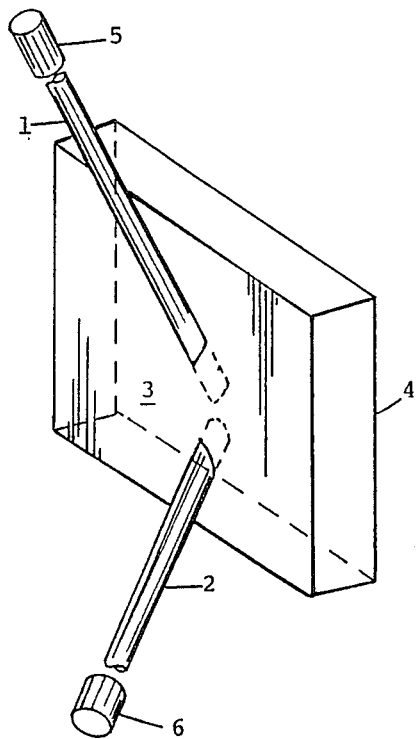
FIG. 1 is a perspective view of the discrete or point sensor embodiment of the invention.
Figure 2A:
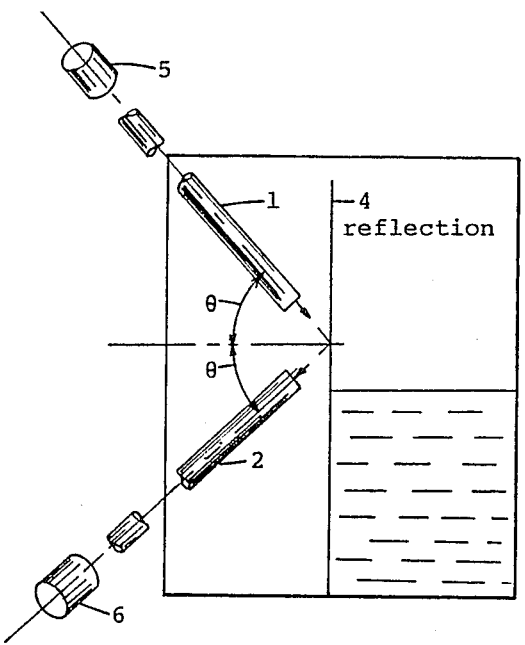
FIGS. 2A and 2B are side views of the discrete fibre optic liquid level sensor shown in FIG. 1, showing the cases of total internal reflection (FIG. 2A) and refraction (FIG. 2B) in the presence of air and liquid respectively.
Figure 2B:
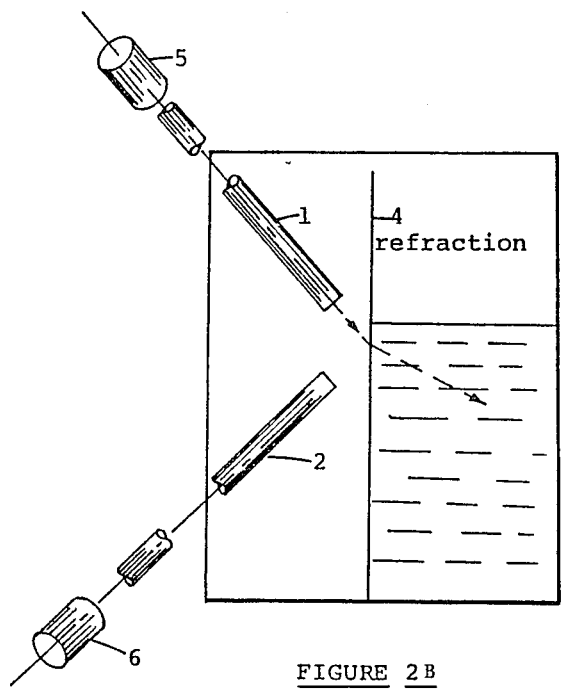

Referring to the drawings, in the discrete or point sensor shown in FIGS. 1 and 2, a source optical fibre 1 is optically coupled to a light source 5 such as a light emitting diode or laser diode and a detector optical fibre 2 is optically coupled to a light detector 6 such as a photodiode or phototransistor. The fibres 1 and 2 are mounted in an optically transparent substrate 3 in the same plane normal to the planar interface surface 4 and at an equal angle $\theta$ to the normal such that the angle of incidence equals the angle of reflection. The optical fibre ends may be polished using standard lapping film techniques or may be simply cleaved or cut, and mounted in blind holes in which some fluid or epoxy, of a refractive index which matches that of the optical fibre core material and the substrate material, has been placed to minimize any optical loss due to refractive index mismatch, i.e. Fresnel loss. The blind end of each hole is normally as close to the interface surface 4 a possible to minimize the optical loss of the effectively unguided light due to the effective end separation of the optical fibres. In the case of a substrate material with a refractive index of 1.5 as would be typical of glass or nylon or some other plastic, and where the liquid is water with a refractive index of 1.33 above which is air with a refractive index of 1.00, the critical angles for total internal reflection are 41.8 degrees and 62.5 degrees for air and water respectively. Hence, if the optical fibres are positioned between these two critical angles, e.g. at 45 degrees with respect to the normal and in the same plane such that the angle of incidence of the light exiting the source optical fibre onto the window to liquid interface equals the angle of reflection and of the detector optical fibre, then in the presence of air, total internal reflection will occur and the light detector 6 will be illuminated signifying an "on" or low level condition (FIG. 2A). When the liquid is present, the light exiting the source fibre will be largely refracted into the liquid and the light detector 6 will be dark, indicating an "off" or high level condition (FIG. 2B).

A multiplicity of such point detectors can be ganged together to approximate continuous level detection.

Figure 3A:
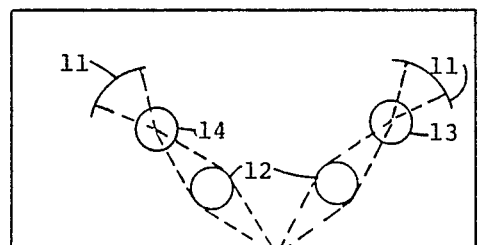
FIG. 3A is a plan view of the continuous fibre optic liquid level sensor embodiment of the invention.
Figure 3B:
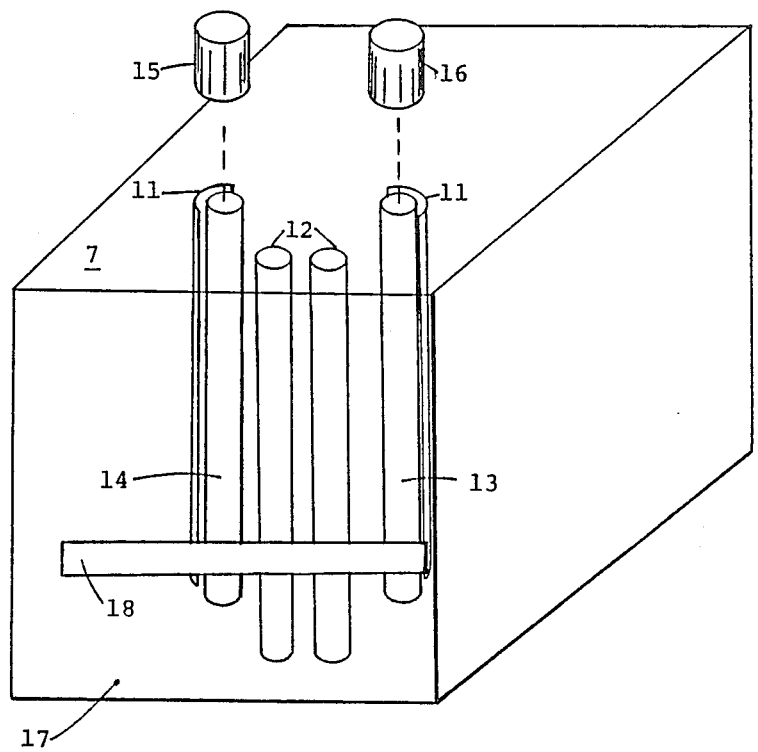
FIG. 3B is a perspective view of the embodiment of FIG. 3A
Figure 4:
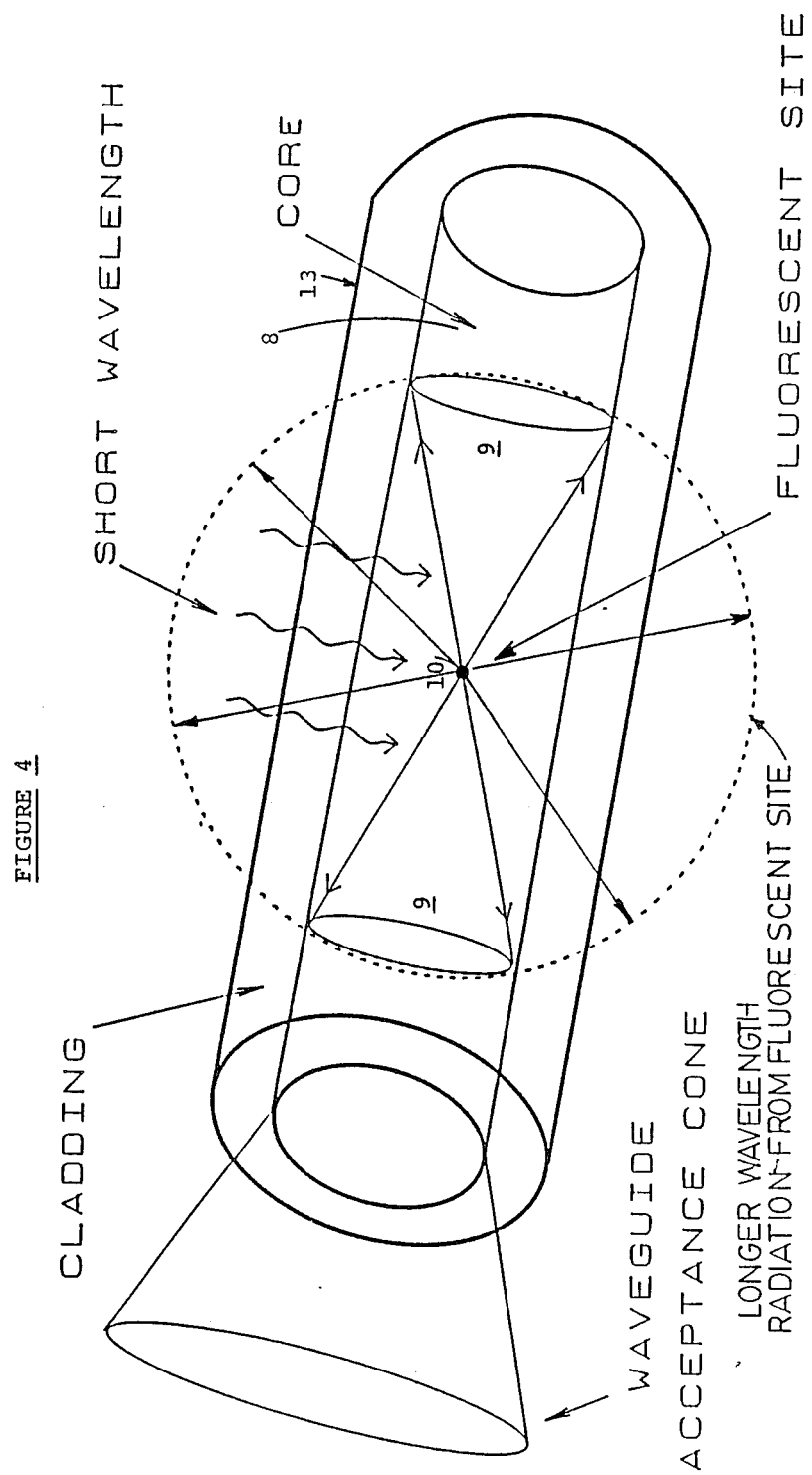
FIG. 4 describes the principle of operation of the fluorescent detector optical fibre shown in FIG. 3.

A truly continuous liquid level sensor can be fabricated with a somewhat different optical fibre arrangement based on the same optical principle and a similar packaging arrangement. In the continuous liquid level sensor as shown in FIGS. 3A and 3B, the source optical fibre 14 and the detector optical fibre 13 are embedded longitudinally in the optically transparent substrate material 7. The two optical fibres are parallel or nearly parallel to one another and to the planar sensor window 17. In addition, a radius from each of the two fibres intersects at or near the sensor window 17 according to the basic laws of reflection. Referring now to FIG. 4, the core 8 of the detector optical fibre 13 is doped with a fluorescent substance which when irradiated or excited with a short wavelength optical source, re-emits light of a longer wavelength. Normally, light passing transverse to and through an optical fibre, that is unguided light, is not coupled into the optical waveguide because its angle of incidence exceeds the critical angle defined by the core and cladding refractive indices. However, in the fluorescent optical fibre, the fluorescent sites (10) in FIG. 4 emit spherically; a portion of this longer wavelength emission as denoted by the cones of light 9 in FIG. 4 will remain as guided light in the detector optical fibre's core, and will propagate to both ends of the optical fibre, at least one end of which has been adapted to optically connect to an external light detector (16 in FIG. 3B) such as a photodiode.

Figure 5:
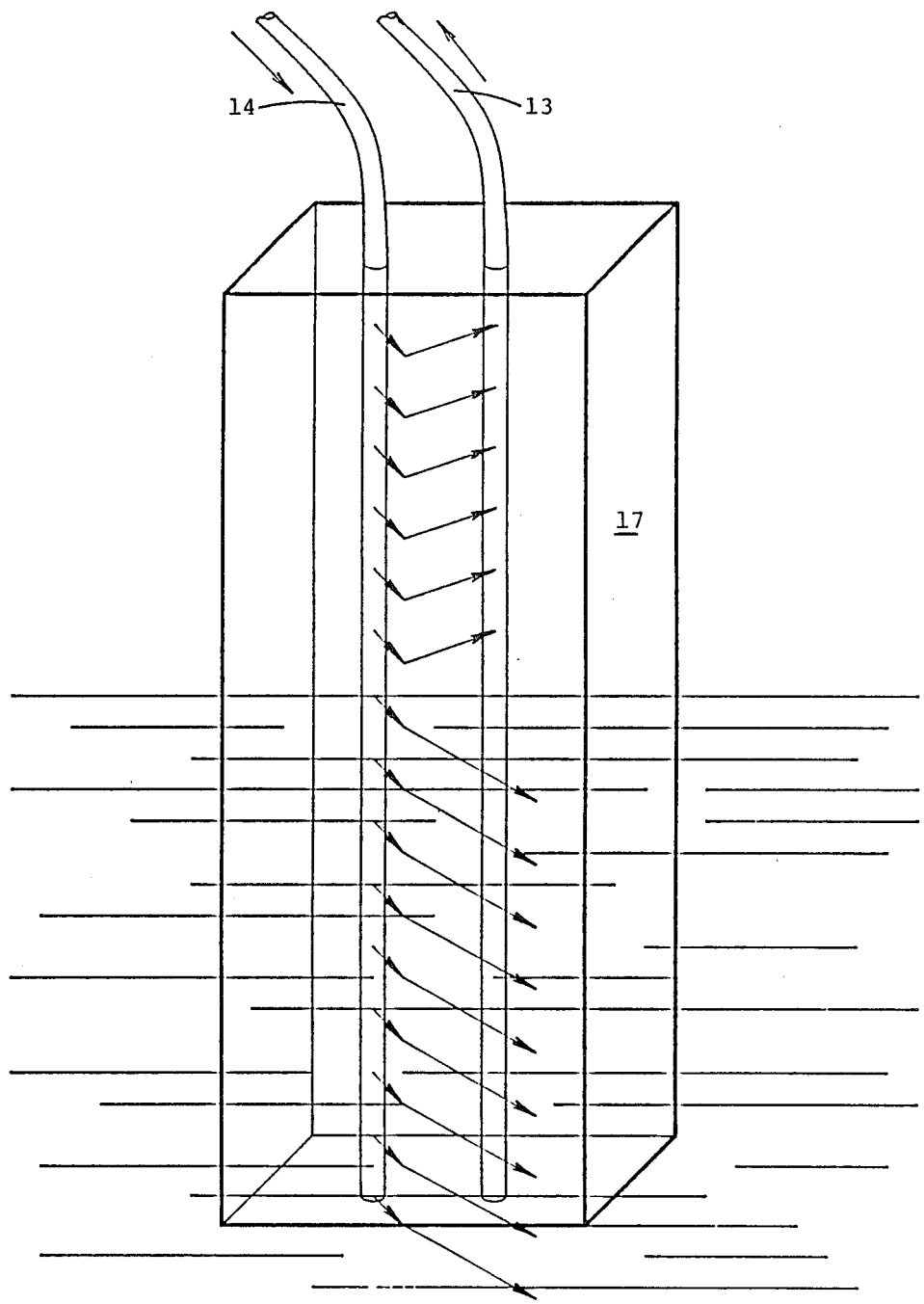
FIG. 5 shows the cases of total internal reflection and refraction in the presence of air and liquid respectively for the embodiment of the invention depicted in FIG. 3.

Referring again to FIG. 3B, the source fibre 14 is optically connected at one or both ends to an external light source 15 which may be a laser diode or flash tube such as a xenon strobe light, either of which has some wavelength or colour component matched to the fluorescence excitation. The source fibre is configured so that light is lost or emitted along its length, thus creating an optical line source. This can be achieved by having the fibre abraded or scratched or modified to include a longitudinal strip of higher refractive index than that of the core. Another means of "leaking" the light from the fibre is to arrange it in a series of microbends. With mirrors or reflective gratings 11 and lenses 12 to redirect the light exiting the source fibre into a more radial and focused direction, that direction being between the critical angles for air and the liquid to be sensed and along the intersecting radii noted previously, the light source fibre 14 illuminates the fluorescent detector optical fibre 13 via total internal reflection as in the previous embodiment, the incident light being proportional to the length of the sensor face which is exposed to the air as shown in FIG. 5. This incident light stimulates a proportional fluorescence signal in the detector optical fibre which is then guided to the external light detector. The light from the line source optical fibre emitted below the liquid's level is refracted into the liquid and does not propagate to the fluorescent fibre where it would contribute to the fluorescence signal. The resulting optical signal received at the light detector corresponds inversely with the liquid level.

The lenses 12 as shown in FIGS. 3A and 3B are convex or cylindrical positive, which is suitable for the case where the refractive index of the lens is greater than that of the medium. If the reverse were true the lenses would be concave or cylindrical negative.

If a portion of the continuous sensor can be protected from other than total internal reflection such as with a mirrored reflecting surface (18 in FIG. 3B) on the window interface to the liquid, then a light signal offset will always be present at the light detector which can be used to indicate the integrity of the optical link from and including the light source to the light detector. Any failure in this link will be instantly detectable thus providing a self checking feature. Placement of the reflector 18 at the base of the assembly permits it to monitor the integrity of the sensor as well a that of the optical link.

Performance of the sensor assembly in FIG. 5 can be improved by constructing the substrate 17 in a series of horizontal slices or laminates 19 coated with an opaque material 20 as seen in FIG. 6. The result is alternating layers of clear and opaque material such that only light rays propagating near the horizontal direction are allowed to travel to the detector fibre, giving enhanced accuracy of level detection.

Another improvement is the addition of a vertically mounted spacer 21 of opaque material placed between the source 14 and detector 13 fibres in order to prevent direct propagation of light between them. Hence the only light that propagates to the detector is that which has been reflected from the window 17 (see FIG. 7).

The sensor can be made to measure parameters other than liquid level. If the vertical spacer 21 described above is allowed to slide vertically in response to an externally applied force, the light output signal will be analogous to the amplitude of the force o displacement. Parameters such as temperature and pressure could be measured by causing the motion of the slide in response to the deflection of a bimetallic element or diaphragm.

If it were desired to measure liquid quantity as opposed to level in odd shaped tanks, the relative positions of the source and detector fibres could be arranged such as to give a stronger signal (e.g. fibres closer together) in parts of the tank having larger surface area and hence representing greater liquid quantity.

A stepwise or "digital" output could be achieved by replacing the detector fibre 13 with a fibre made up of a series of fluorescent fibre segments 22 joined by non-fluorescent fibre segments 23 as shown in FIG. 8. Such an arrangement would be tolerant to signal variations imposed by varying environmental conditions, as the presence of a signal within a certain range would be known to indicate a specific level. A stepwise output could also be achieved by retaining the fluorescent detector fibre but replacing the continuous source fibre with a series of fibres of different lengths (one terminating at each "step"). The fibres could share a common optical source. The output would give a "count" of the number of source fibres exposed and hence indicate the liquid level. Either of these step-output arrangements could be arranged non-linearly to provide liquid quantity measurement (as opposed to level) in irregularly shaped tanks as described above.

The embodiments of the invention in which an exclusive property or privilege is claimed are defined as follows:

1. An indicating device for showing the level of fluids in a container, comprising at least two optical fibers having at least a portion thereof embedded in a transparent substrate material of similar refractive index, one of said fibers being optically connected to a light source and being capable of emitting a particular wavelength or range of wavelengths of light along its length, the other fiber being optically connected to a light detector and being doped so as to fluoresce at the wavelength(s) emitted by said source fiber, the two optical fibers being oriented with respect to an interface between said substrate and the fluids to be measured so that light exiting the source fiber is coupled into the detector fiber when total internal reflection occurs at the substrate-fluid interface in the presence of a first fluid, and coupling does not occur in the presence of a second fluid of higher refractive index than the first fluid.

2. The device according to claim 1, characterized in that the source and detector optical fibres and the substrate - fluid interface are not parallel to each other, the deviation from the parallel being arranged such as to linearize the optical output in irregular-shaped tanks, thereby giving a direct measurement of liquid quantity.

3. The device according to claim 1, characterized by the application of mirrors, reflective gratings, and/or lenses to maximize the radial optical coupling between the source optical fibre and the detector optical fibre under the condition of total internal reflection.

4. The device according to claim 1, characterized in that a portion of the substrate's interface to the fluid is reflective such that some reflection always occurs thus providing a self checking feature.

5. The device according to claim 3, characterized in that the lenses are convex or cylindrical positive if the lens material is of a higher refractive index than that of the substrate material.

6. The device according to claim 3, characterized in that the lenses are concave or cylindrical negative if the lens material is of a lower refractive index than that of the substrate material.

7. The device according to claim 1, characterized in that periodic opaque spacers segment the substrate to block shallow angle light rays exiting the source optical fibre and to prevent coupling of these light rays to the detector optical fibre by other than the primarily radial direction of total internal reflection.

8. The device according to claim 1, characterized in that an opaque separator is provided longitudinally between the source optical fibre and the detector optical fibre to prevent any optical coupling between the two optical fibres by other than total internal reflection.

9. The device according to claim 1 configured with a series of bundled source fibres of different lengths, the output signal from the fluorescent detector fibre varying stepwise with the fluid level.

10. The device according to claim 1 wherein the detector fibre includes discrete fluorescent segments joined alternating with non-fluorescent segments, the output thereby varying stepwise with the fluid level, the source fibre being a single line fibre.

11. The device according to claim 2 wherein the source and detector optical fibers are essentially parallel to each other and to the substrate-fluid interface.

12. A method for showing the level of fluids in a container, comprising:
  embedding at least a portion of each of two optical fibers in a transparent substrate material having a refractive index similar to that of the optical fibers;
  connecting a first of said optical fibers to a light source to cause said first optical fiber to emit a specified wavelength or range of wavelengths;
  producing in a second of said optical fibers a fluorescence in response to light of said specified wavelength from said first optical fibers;
  detecting the light producing by fluorescence in said second optical fiber;
  providing an interface between said substrate material and fluids to be detected;
  orienting said fibers with respect to said interface so that light emitted by said first optical fiber is coupled into said second optical fiber when total internal reflection occurs at the substrate-fluid interface in the presence of a first fluid and coupling does not occur in the presence of a second fluid of higher refractive index than the first fluid.

* * * * *